United States Patent [19]

Behn et al.

[11] Patent Number: 4,615,908
[45] Date of Patent: Oct. 7, 1986

[54] METHOD FOR THE MANUFACTURE OF PLASMA-POLYMER MULTILAYER CAPACITORS

[75] Inventors: Reinhard Behn, Munich; Rudolf Wittmann, Heidenheim, both of Fed. Rep. of Germany

[73] Assignee: Siemens Aktiengesellschaft, Berlin & Munich, Fed. Rep. of Germany

[21] Appl. No.: 777,357

[22] Filed: Sep. 18, 1985

[30] Foreign Application Priority Data

Nov. 7, 1984 [DE] Fed. Rep. of Germany ....... 3440703
May 15, 1985 [DE] Fed. Rep. of Germany ....... 3517631

[51] Int. Cl.$^4$ ................................................ H01G 1/01
[52] U.S. Cl. ........................................ 427/81; 427/79; 427/123; 427/124; 427/125; 427/404; 427/407.1; 361/305; 361/313; 361/323
[58] Field of Search ............... 427/79, 81, 123, 124, 427/125, 404, 407.1; 361/305, 313, 323

[56] References Cited

U.S. PATENT DOCUMENTS

| | | | |
|---|---|---|---|
| 3,476,531 | 11/1969 | Brewer et al. | 29/195 |
| 3,757,177 | 9/1973 | Buehler | 361/305 |
| 3,988,651 | 10/1976 | Hertz | 361/305 |
| 4,482,931 | 11/1984 | Yializis | 361/305 |

FOREIGN PATENT DOCUMENTS

| | | |
|---|---|---|
| 0041679 | 6/1981 | European Pat. Off. . |
| 2359432 | 6/1975 | Fed. Rep. of Germany ...... 361/305 |
| 2513509 | 10/1976 | Fed. Rep. of Germany . |
| 2036087 | 5/1980 | United Kingdom .................. 427/81 |
| 2106714 | 5/1982 | United Kingdom . |

*Primary Examiner*—Richard Bueker
*Attorney, Agent, or Firm*—Hill, Van Santen, Steadman & Simpson

[57] ABSTRACT

A method for the manufacture of electrical plasma-polymer multilayer capacitors wherein alternate layers of thin metal conductors and dielectric layers produced by radiation polymerization are deposited on a substrate, after which the portions of the metal layers to which electrical contact is to be made are etched, preferably by sputter etching, to remove oxides therefrom. Then, contact layers are applied to the opposite end faces of the substrate to provide electrical connections for the portions of the metal layers which have been etched, the contact layers consisting of the sequence (1) an aluminum layer, (2) a nickel layer, and (3) a palladium layer.

8 Claims, 3 Drawing Figures

METHOD FOR THE MANUFACTURE OF PLASMA-POLYMER MULTILAYER CAPACITORS

BACKGROUND OF THE INVENTION

1. Field of the Invention

The present invention is in the field of manufacturing electrical multilayer capacitors and is specifically directed to an improved contact layer for connection to the metallic thin films of the multilayer capacitors, the layer consisting of a combination of aluminum, nickel, and palladium layers.

2. Description of the Prior Art

There is a method described in the prior art for the manufacture of electrical plasma-polymer multilayer capacitors wherein regenerable thin metal layers, preferably composed of aluminum, serve as electrodes and dielectric layers produced by radiation polymerization are alternated with the layers of aluminum and deposited on a carrier material. The electrodes are then freed of oxide layers by sputter etching in the regions intended for contacting the metallic contact layers, and finally, such contact layers are applied to two opposite end faces of the carrier material, partially overlapping the electrodes.

Such a method is disclosed in earlier German Patent Application No. P 34 39 688.8. This application described a composition for contact layers consisting of a structure having a chromium-nickel base layer, a copper intermediate layer, and a covering layer of palladium, palladium-silver, or tin, or a layer sequence having an aluminum base layer and a cover layer of the above-mentioned metals without an intermediate layer.

The aluminum-palladium sequence of layers, however, shows a definite long-term deficiency in the dielectric loss factor. Above this, these layer sequences must be resistant to flow solder for chip application of the capacitor. With the aforementioned metals, however, this requires correspondingly thick metal layers in order to prevent a complete degeneration. For example, the three-layer sequence usually measures about 1.7 microns, and the two-layer sequence about 1.3 microns.

By way of additional background, reference is invited to UK Published Patent Application No. 2 106 714 which describes a ceramic capacitor containing alternate layers of ceramic dielectric material and electrode layers interposed therebetween. Alternate electrode layers have edge portions extending to and exposed at the margins of the capacitor. The margins are coated with a sputter deposited metallic layer which is bonded to the exposed ceramic components of the margins and to the exposed portions of the electrode layers to thereby provide the two terminals. The exposed electrode edges on a given margin are electrically interconnected and the components of the margins are mechanically bonded. The metallic layer may be of nickel or nickel-vanadium alloy and may include a plurality of sub-layers such as chromium, nickel, or silver each applied by sputter deposition.

U.S Pat. No. 3,476,531 describes a circuit contact for wave soldering of metallic leads to thin film resistors. The circuit contact disclosed consists of a copper layer upon which palladium is deposited so that oxidation of the copper is precluded. The amount of palladium present is such that all of the palladium goes into solid solution upon the subsequent application of solder to attach a wire lead to the contact. The contact has a base layer consisting of an 80-20 nickel-chromium alloy, a layer of copper over the base layer, and a layer of palladium on the copper layer.

For further background material, reference is invited to European Published Patent Application No. 0 041 679 and to German OS No. 25 13 509.

SUMMARY OF THE INVENTION

The present invention provides a method for the manufacture of electrical plasma-polymer multilayer capacitors of the type described previously wherein the undesirable increase of the loss factor is diminished and, at the same time, the resistance to flow solder or wave soldering is achieved with a lower layer thickness of contact layers.

The improvements of the present invention involve first providing an aluminum contact layer which is sputtered on or vapor deposited onto the exposed metallic thin films at the opposite faces of the capacitor, followed by deposition of first a nickel layer and finally a palladium layer.

The aluminum and nickel layers preferably are composed of layer thicknesses of at least 0.3 micron while the palladium layer comprises a layer of thickness of at least 0.09 micron. The total thickness of the three layers is less than 1 micron and is typically on the order of 0.7 micron.

Additional improvements can be secured by adding from 1 to 10 weight percent copper, magnesium, or silicon, or mixtures of these metals as alloying ingredients to the aluminum layer during its manufacture.

BRIEF DESCRIPTION OF THE DRAWINGS

Other advantages and features of the present invention will be explained in greater detail with reference to the following illustrative embodiments in which.

DESCRIPTION OF THE PREFERRED EMBODIMENTS

Figure 1:
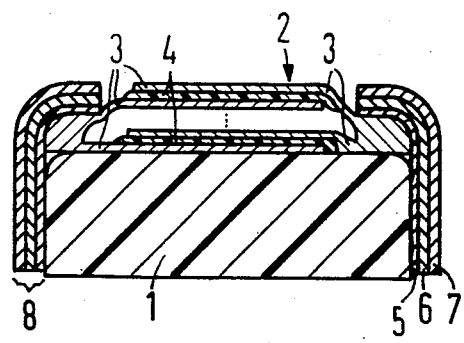
FIG. 1 is a cross section on an enlarged scale through a multilayer capacitor according to the present invention.

In FIG. 1 there is illustrated a cross-sectional view of a multilayer capacitor 2 which is formed on an insulating carrier or substrate material 1. The capacitor structure 2 is first formed on a substrate 1 by the alternate deposition of metal layers 3 and radiation polymerized polymeric dielectric layers 4. The techniques for applying such layers are well known in the art and need not be repeated here.

The metal layers 3 are then subjected to a sputter etching in the region projecting beyond the dielectric layers 4, the sputter etching serving to remove oxide layers in the terminal region. Without further intermediate aeration or exposure, an aluminum layer 5 which serves as a conductive layer is deposited onto the end faces of the substrate 1 and the contact region of the aluminum electrodes 3. The thickness of this layer 5 amounts to at least 0.3 micron. The aluminum of the contact layer comes into direct contact with the aluminum of the electrodes 3, whereby corrosion problems and problems due to interdiffusion are avoided. It is advantageous to add 1 to 10 weight percent copper, magnesium, silicon, or mixtures of the same to alloy with the aluminum in the formation of the aluminum alloy layer 5. This prevents thermo-migration, that is, the outward migration of aluminum atoms.

A nickel layer 6 is deposited over the aluminum layer 5, to serve as a parting layer and has a thickness of at least 0.3 micron. Due to the extremely low solubility of nickel in solder melts, the nickel layer 6 prevents the de-alloying of the contact layer identified generally at reference numeral 8 during flow-type soldering. Nickel also acts as a diffusion barrier against the internal diffusion of solder metal into the aluminum layer 5 and simultaneously acts as a parting agent between the aluminum layer and the subsequently applied cover layer 7 of palladium. In direct contact in a damp climate, i.e., a high relative humidity, aluminum and palladium form a highly corrosive element upon decomposition of aluminum. This is prevented by the interposition of the nickel layer, and the nickel also serves to improve the stability of the loss factor.

The palladium layer 7 serves as a cover layer for preserving the solderability of the described layer structure, and has a thickness amounting to at least 0.09 micron.

In comparison to capacitors generally known from the prior art comprising adjacent layers of aluminum and palladium which require an overall layer thickness of at least 1.3 microns in order to obtain layers that are resistant to flow solder, an overall thickness of less than 1 micron and usually about 0.7 micron is adequate for the improved layer sequence of aluminum-nickel-palladium.

Either sputter deposition or vapor deposition methods can be used for applying each of the three layers in the sequence, allowing the required sputter etching to be carried out without intermediate treatment and allowing the three described layers to be applied likewise without intermediate oxidation.

Figure 2:
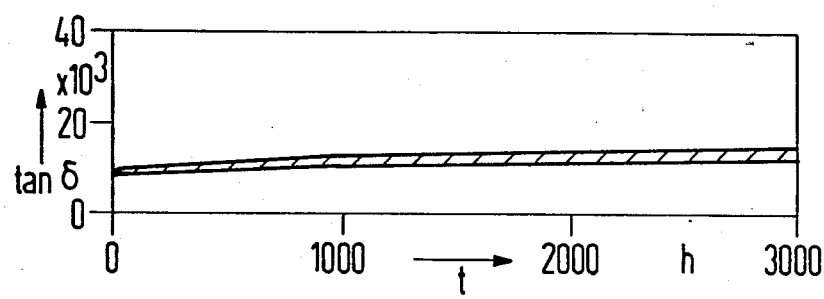
FIG. 2 is a graph plotting loss factor against time for the improved capacitors of the present invention, at a relatively high humidity.

In FIG. 2, there is illustrated the long-term behavior of the loss factor tan δ, at 100 kHz, in a damp climate of 92% relative humidity at 40° C., and 0 volts. The group of observed values included within the shaded area of the graph illustrate that the loss factor rises only insignificantly even under conditions of relatively high humidity.

Figure 3:
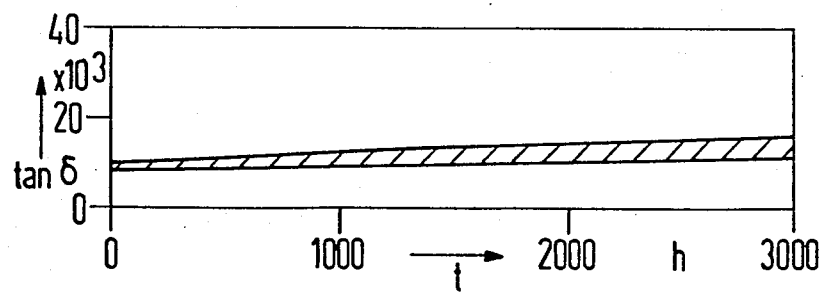
FIG. 3 is a graph plotting change in loss factor against time at elevated temperatures.

Similarly, in FIG. 3, the loss factor change in time at 100 kHz and 100° C., at 0 volts, is also illustrated. The observed values clearly indicate that the loss factor change is insignificant even under conditions of relatively high temperature.

It will be understood that various modifications can be made to the described embodiments without departing from the scope of the present invention.

We claim as our invention:

1. A method for the manufacture of electrical plasmapolymer multilayer capacitors which includes the steps of:
   depositing alternate layers of metal conductors and dielectric layers produced by radiation polymerization on a substrate,
   etching the portions of said metal layers to which electrical contact is to be made to remove oxide layers therefrom, and
   applying contact layers to opposite end faces of said substrate to provide electrical connections for said portions of said metal layer, said contact layers consisting of the sequence: (1) an aluminum layer, (2) a nickel layer, and (3) a palladium layer.

2. A method according to claim 1 in which said etching consists of sputter etching.

3. A method according to claim 1 wherein said aluminum layer is applied by sputtering.

4. A method according to claim 1 wherein said aluminum layer is applied by vapor deposition.

5. A method according to claim 1 wherein said aluminum layer and said nickel layer are each deposited to a thickness of at least 0.3 micron and said palladium layer is deposited to a thickness of at least 0.09 micron.

6. A method according to claim 5 wherein the total thickness of said aluminum, nickel and palladium layers is not in excess of 1 micron.

7. A method according to claim 6 wherein said total thickness is about 0.7 micron.

8. A method according to claim 1 wherein said aluminum layer contains from 1 to 10 weight percent of copper, magnesium, or silicon.

* * * * *